US012227355B2

(12) United States Patent
Hognaland et al.

(10) Patent No.: US 12,227,355 B2
(45) Date of Patent: Feb. 18, 2025

(54) CONTROLLING MOVEMENTS OF A ROBOT RUNNING ON TRACKS

(71) Applicant: Autostore Technology AS, Nedre Vats (NO)

(72) Inventors: Ingvar Hognaland, Nedre Vats (NO); Ivar Fjeldheim, Haugesund (NO); Jørgen Djuve Heggebø, Olen (NO)

(73) Assignee: AutoStore Technology AS, Nedre Vats (NO)

( * ) Notice: Subject to any disclaimer, the term of this patent is extended or adjusted under 35 U.S.C. 154(b) by 571 days.

(21) Appl. No.: 17/643,358

(22) Filed: Dec. 8, 2021

(65) Prior Publication Data

US 2022/0097968 A1     Mar. 31, 2022

Related U.S. Application Data

(63) Continuation of application No. 16/347,159, filed as application No. PCT/EP2017/077171 on Oct. 24, 2017, now Pat. No. 11,225,377.

(30) Foreign Application Priority Data

Nov. 2, 2016   (NO) .................................. 20161733

(51) Int. Cl.
  *B65G 1/04* (2006.01)
  *B25J 5/00* (2006.01)
  *G05D 1/00* (2024.01)
(52) U.S. Cl.
  CPC ............ *B65G 1/0492* (2013.01); *B25J 5/007* (2013.01); *G05D 1/0229* (2013.01); *G05D 1/0272* (2013.01); *B65G 1/0464* (2013.01)

(58) Field of Classification Search
  CPC ...... B65G 1/0492; B65G 1/0464; B65G 1/04; B25J 5/007; G05D 1/0229; G05D 1/0272; G05D 2201/0216; G05B 19/41895
  See application file for complete search history.

(56) References Cited

U.S. PATENT DOCUMENTS

| 7,605,557 B2 | 10/2009 | Yourlo et al. |
| 2005/0103223 A1 | 5/2005 | Schneider et al. |
| 2007/0150096 A1 | 6/2007 | Yeh et al. |

(Continued)

FOREIGN PATENT DOCUMENTS

| CN | 1618578 A | 5/2005 |
| CN | 1739924 A | 3/2006 |

(Continued)

OTHER PUBLICATIONS

Notice of Reasons for Refusal issued in Japanese Application No. 2021-198387 mailed on Oct. 24, 2022 (6 pages).

(Continued)

*Primary Examiner* — Thomas Ingram
(74) *Attorney, Agent, or Firm* — Baker Botts L.L.P.

(57) ABSTRACT

A method for controlling movement of a robot on a plurality of tracks laid out on a frame structure forming a grid includes detecting a current speed and an angular position for one wheel in a pair of wheels of the robot; tracking a current position of the robot relative to at least a portion of the frame structure; and setting a driving sequence for the pair of wheels, based on a position information of the robot.

20 Claims, 2 Drawing Sheets

(56) References Cited

U.S. PATENT DOCUMENTS

| | | | |
|---|---|---|---|
| 2010/0206651 | A1 | 8/2010 | Nagasaka |
| 2010/0318059 | A1 | 12/2010 | Farritor et al. |
| 2011/0224605 | A1 | 9/2011 | Farritor et al. |
| 2012/0185122 | A1* | 7/2012 | Sullivan ............... B65G 1/0492 701/23 |
| 2012/0316722 | A1* | 12/2012 | Zeitler ................. G05D 1/0261 701/23 |
| 2013/0087393 | A1 | 4/2013 | Vanderstegen-Drake et al. |
| 2013/0302132 | A1* | 11/2013 | D'Andrea ............ G06Q 10/087 414/807 |
| 2014/0074328 | A1* | 3/2014 | Schaffler ................. B60T 8/175 903/902 |
| 2015/0309511 | A1 | 10/2015 | Sullivan et al. |
| 2016/0167706 | A1* | 6/2016 | Van Meijl ............... B64F 1/368 701/41 |
| 2016/0368710 | A1* | 12/2016 | Ramankutty ........ B65G 1/0421 |
| 2018/0075402 | A1 | 3/2018 | Stadie et al. |
| 2020/0363819 | A1* | 11/2020 | Stadie .................... G06Q 50/28 |

FOREIGN PATENT DOCUMENTS

| | | |
|---|---|---|
| CN | 101647681 A | 2/2010 |
| CN | 101885350 A | 11/2010 |
| CN | 202703736 U | 1/2013 |
| CN | 103383570 A | 11/2013 |
| CN | 104364121 A | 2/2015 |
| CN | 105116918 A | 12/2015 |
| CN | 205059789 U | 3/2016 |
| CN | 105899398 A | 8/2016 |
| EP | 0 560 881 B1 | 1/1996 |
| EP | 1037828 B1 | 9/2003 |
| EP | 1 442 847 A2 | 8/2004 |
| EP | 3002656 A1 | 4/2016 |
| EP | 3050824 A1 | 8/2016 |
| EP | 3070563 A1 | 9/2016 |
| JP | H08-324772 A | 12/1996 |
| JP | H10-11140 A | 1/1998 |
| JP | H10-97321 A | 4/1998 |
| JP | 2004-94501 A | 3/2004 |
| JP | 2004-157885 A | 6/2004 |
| JP | 2007-293389 A | 11/2007 |
| JP | 2012-173760 A | 9/2012 |
| JP | 2014-006833 A | 1/2014 |
| JP | 2016-206346 A | 12/2016 |
| KR | 100886113 B1 | 2/2009 |
| NO | 317366 B1 | 10/2004 |
| WO | 2014/090684 A1 | 6/2014 |
| WO | 2015019055 A1 | 2/2015 |
| WO | 2015/193278 A1 | 12/2015 |
| WO | 2016/120075 A1 | 8/2016 |

OTHER PUBLICATIONS

Office Action issued in counterpart Japanese Patent Application No. 2021-198387 mailed on Jul. 25, 2023 (4 pages).
Office Action issued in Chinese Application No. 201780067541.8; Dated Feb. 23, 2022 (7 pages).
International Search Report issued in Application No. PCT/EP2017/077171, mailed on Jan. 18, 2018 (5 pages).
Written Opinion issued in International Application No. PCT/EP2017/077171, mailed on Jan. 18, 2018 (9 pages).
International Preliminary Report on Patentability issued in Application No. PCT/EP2017/077171, mailed on Jan. 28, 2019 (12 pages).
Liu K, et al.; "Fuzzy logic-based navigation controller for an autonomous mobile robot;" Automation & Robotics Research Institute, The University of Texas at Arlington; 7300 Jack Newell Blvd., S., Fort Worth, TX 76118-7115, USA; 1994 (8 pages).
Notice of Opposition issued in the counterpart European Patent Application No. 3535633, mailed on May 5, 2021 (5 pages).
Braunl, Thomas; "Embedded Robotics, Mobile Robot Design and Applications with Embedded Systems"; Springer, 2006 (455 pages).
Notice of Opposition issued in the counterpart European Patent Application No. 3535633, mailed on May 4, 2021 (7 pages).
English translation of Norwegian Application No. 317366 B1 previously cited on May 5, 2019 (14 pages).
Jakob Hatteland Computer AS; "Commercial Manual-AutoStore Concept Version 01.10a"; Jan. 30, 2004 (36 pages).
Laumond, J.-P.: "Robot Motion Planning and Control"; Great Britain, Springer, 1998 Ed. First (86 pages).
Everett, H.R.; "Sensors for Mobile Robots—Theory and Application"; USA: A.K. Peters, Ltd., 1995, Ed. First (18 pages).
Jones, Joseph L. et al.; "Mobile robots—Inspiration to Implementation"; USA: A.K. Peters, Ltd, 1998 Ed. Second (14 pages).
LeGrand, Rich; "Closed-Loop Motion control for Mobile Robotics"; Circuit Cellar, vol. 169, Aug. 2004 (11 pages).
Chirstopher Batten; "Control for Mobile Robots"; Massachusetts Institute of Technology, Jan. 7, 2005 (71 pages).
Alberto Pepe et al.; "Introductions to Mobile Robotics"; University of Bologna, Jun. 2, 2016 (104 pages).
Cpmparison specification of as-filed PCT/EP2017/077171 Application and as-granted European Patent Application 3535633 B1 (10 pages).
Notice of Opposition to EP 3 535 633 B1 in the name of Autostore Technology AS; Opponent: Abitz & Partner (29 pages).
Statement of opposition to EP 3 535 633 B1 in the name of Autostore Technology AS; Opponent: Elkington and Fife LLP (23 pages).
Office Action in counterpart Japanese Patent Application No. 2019-522218 issued on Jul. 15, 2021 (6 pages).
Office Action in counterpart Chinese Patent Application No. 201780067541.8 issued on Jul. 26, 2021 (19 pages).
X. Bao; "Optimizing Control Speed of Wheeled Robot"; Machine Building & Automation, vol. 38, No. 6, pp. 164-165, 179; Dec. 2009 (3 pages).
U. Schwesinger et al; "A Novel Approach for Steeringwheel Synchronization With Velocity/Acceleration Limits and Mechanical Constraints"; 2012 IEEE/RSJ International Conference on Intelligent Robots and Systems, pp. 5360-5366; Oct. 7-12, 2012 (7 pages).
V. Pitkänen et al; "Synchronization of mobile robot's actuated wheels"; Intelligent Robots and Computer Vision XXXII: Algorithms and Techniques, vol. 9406, pp. 1-11 ; Feb. 8, 2015 (11 pages).
L. Zhang; "Development of wheeled autonomous navigation robot"; IChina Master's Theses Full-text Database Information Technology, No. 3, pp. 140-183; Sep. 15, 2004 (79 pages).
Summons to attend oral proceedings issued in European Application No. 17790754.0 dated Nov. 11, 2021.

* cited by examiner

CONTROLLING MOVEMENTS OF A ROBOT RUNNING ON TRACKS

BACKGROUND

One or more embodiments of the present invention relate to a remotely operated robot moving on tracks laid out on a frame structure, and more specifically to a method and controller for controlling each wheel and synchronising pairs of wheels of the robot for moving it smoothly from a start to a stop position relative the frame structure.

BACKGROUND

A remotely operated vehicle or robot for picking up storage bins from a storage system is known. A detailed description of a relevant prior art storage system is presented in EP1037828B1, and details of a prior art vehicle being suitable for such a storage system is disclosed in detail in Norwegian patent NO317366B1 and WO2015193278A1. Such prior art storage systems comprise a three-dimensional storage grid containing storage bins that are stacked on top of each other up to a certain height. The storage grid is normally constructed as aluminium columns interconnected by top rails or tracks, onto which a plurality of remotely operated vehicles, or robots, are arranged to move laterally. Each vehicle is equipped with motors for moving the vehicle from one position to another and for driving a lift device adapted for picking up, carrying, and placing bins that are stored in the storage grid. A power supply is supplying power to the motors and drivers comprised in the vehicle, e.g. a rechargeable battery. The vehicle typically communicates with a control system via a wireless link and can be recharged at a charging station when needed.

Rotation of the wheels may be driven by belts connected to the wheels or by individual driving means situated at or at least partly within the wheels. The last example will provide a responsive robot with high control of acceleration and deceleration between a start and a stop position.

When the wheels of a robot moving on straight tracks are controlled and operated individually, they must be controlled as if they where one entity for moving the robot in a steady movement without being driving the robot in an off-lead angle.

Ideally similar sized wheels will rotate at the same speed when a robot is moving. When each wheel is driven separately, there are however several factors that may contribute to different rotation speeds for the wheels. Such factors may be spinning, gliding and loading the wheels differently. If this occurs, the movements of the robot will not be smooth and it may be driven in an off-lead angel.

It is thus an object of the present invention to provide a method and device for optimal control of the movements of a robot for moving it smoothly from a start to a stop position on tracks irrespective of any disturbances that may occur for the wheels when rolling on the tracks. This is achieved by setting up speed driving sequences for controllers controlling each wheel of the robot and where the controller is synchronising pairs of wheels according to the speed driving sequence for moving the robot smoothly from a start to a stop position.

SUMMARY

One or more embodiments of the invention is defined by a method for controlling movements of a robot from a start to a stop position, where the robot is moving on tracks laid out on a frame structure forming a grid, the robot having pairs of wheels being controlled by local controllers connected to individual drivers for each wheel.

The method is characterized in monitoring each wheel with speed and angular position sensors connected to the local controllers controlling pairs of wheels, and where the following steps are being performed in a master controller communicating with each of the local controllers:
receiving a start and stop position of the robot;
receiving current speed and angular position of each wheel from the local controllers;
receiving a global position of the robot relative to the frame structure;
setting up individual speed driving sequences for each pair of wheels based on current speed and angular position of each wheel, current global position of the robot and the start and stop position of the robot;
transmitting the speed driving sequence to each of the local controllers for controlling accelerating and decelerating of each pair of wheels, and
repeating the steps above for controlling the movements of the robot from a start to a stop position.

Further features of the method are defined in the dependent claims.

One or more embodiments of the invention is further defined by a master controller for controlling movements of a robot from a start to a stop position, where the robot is moving on tracks laid out on a frame structure forming a grid, the robot having pairs of wheels being controlled by local controllers connected to individual drivers for each wheel. The master controller is connected to the local controllers controlling each pair of wheels, where the local controllers are providing speed and angular position of each wheel to the master controller by means of speed and angular sensors connected to the local controllers, and where the master controller comprises:
input means for receiving a start and stop position of the robot and current speed and angular position of each wheel provided by the local controllers;
input means for receiving a global position of the robot relative to the frame structure;
calculation means for setting up individual speed driving sequences for each pair of wheels based on current speed and angular position of each wheel, current global position of the robot and the start and stop position of the robot;
output means for transmitting the speed driving sequence to each of the local controllers controlling accelerating and decelerating of each pair of wheels.

Further features of the master controller are defined in the dependent claims.

BRIEF DESCRIPTION OF THE DRAWINGS

One or more embodiments of the invention will now be described with reference to the figures, where:

One or more embodiments of the invention is defined by a method and controller for controlling each wheel and synchronising pairs of wheel of the robot for moving it smoothly from a start to a stop position. Controlled smooth movements of a robot is especially important when the robot is moving on tracks for moving it efficiently from one point to another while avoiding movements in an offlead angle. FIGS. 1 and 2 illustrate robots moving on track on top of a storage system.

FIG. 1 shows a section of a storage system 10 where several remotely operated robots 50 are arranged directly above respective storage columns 30 made by frame structure making a bin storage grid 40. The upper part of the bin storage grid 40 is provided with dedicated supporting tracks 20 for the robots 50 to run on. The robots 50 are configured to move in x and y directions on the tracks 20, and to receive a storage bin from a storage column 30 within the bin storing grid 40.

FIG. 2 shows an example of a remotely operated robot 50. The robot 50 is adapted for picking up storage bins from an underlying storage system 10. The body of the robot 50 comprises a cavity for receiving a storage bin. In this example, the cavity is arranged centrally within the robot 50 and is surrounded by the body of the robot 50. The body of the robot 50 further comprises a lifting device for lifting and lowering a storage bin. One or more embodiments of the invention are however applicable to any type of robot with wheels.

The robot 50 further comprises wheels 60 allowing movement of the robot 50 along first and second directions x, y on the underlying storage system 10. The wheels 60 are connected to drivers situated at or at least partly within the wheels 60 for providing driving force to the robot 50. This configuration will occupy minimum space within the robot 50, thereby freeing space for other installations in the robot 50.

The robot 50 further comprises control means configured to control the movements of the robot 50. The control means for each wheel 60 are connected to the drivers which are connected to each wheel 60. The robot 50 is further provided with wireless communication for receiving and transmitting signals.

Figure 1:
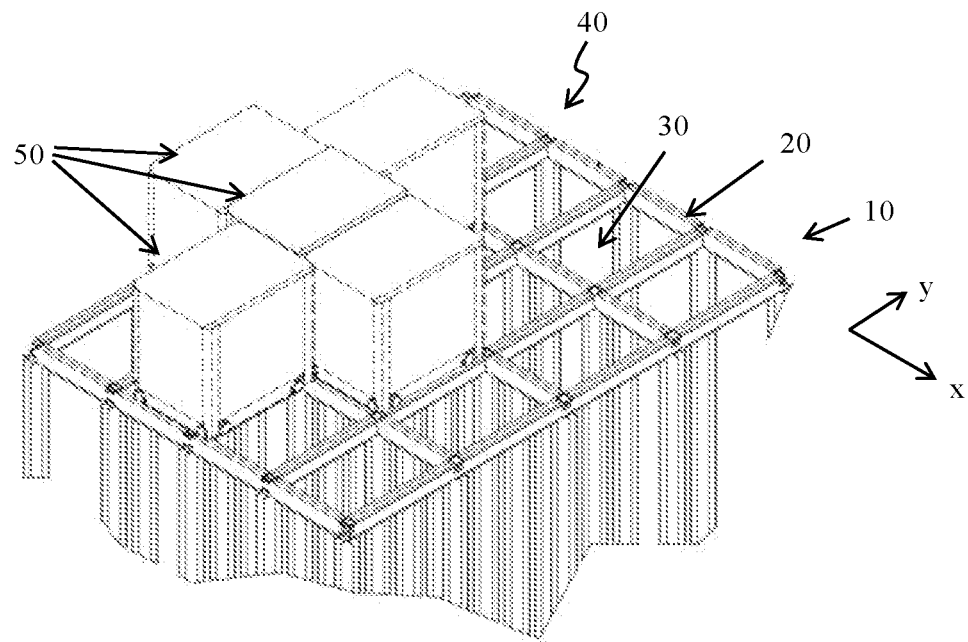
FIG. 1 shows a section of a storage system where several robots are arranged directly above respective storage columns in accordance with one or more embodiments.
Figure 2:
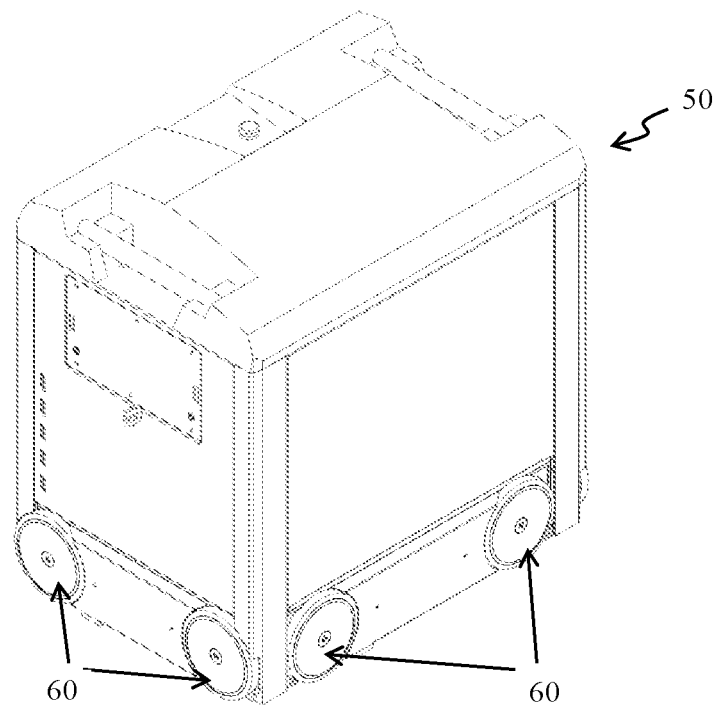
FIG. 2 shows an example of a remotely operated robot with a set of individually driven wheels in accordance with one or more embodiments.
Figure 3:
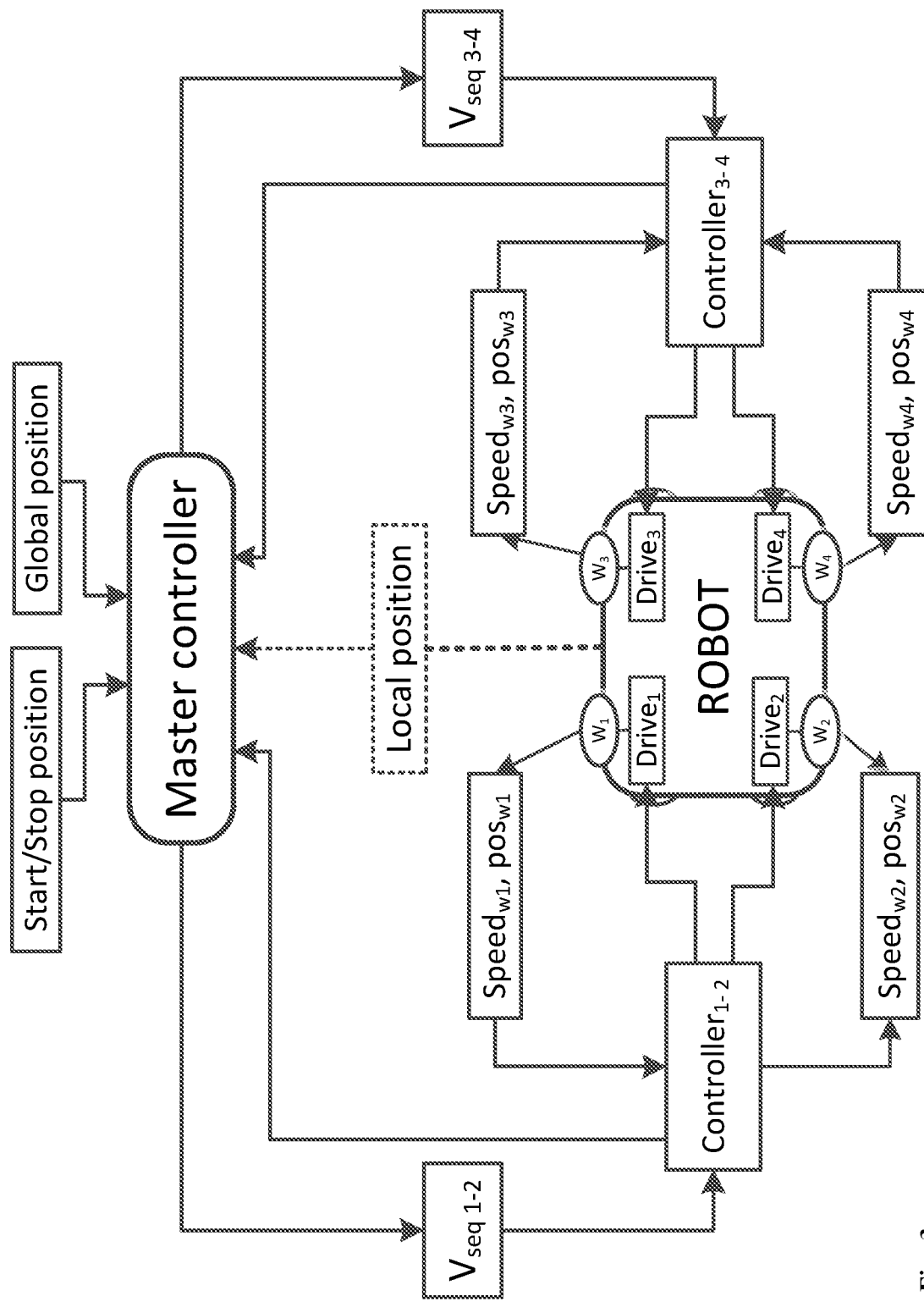
FIG. 3 shows an overview of the master controller and local controllers for controlling pairs of wheels of a robot according to one or more embodiments.

FIG. 3 shows an overview of a master controller according to one or more embodiments of the invention. The master controller being adapted for controlling movements of a robot 50 from a start to a stop position, where the robot 50 is moving on tracks laid out on a frame structure forming a grid, the robot 50 having pairs of wheels, $W_1$ and $W_2$, $W_3$ and $W_4$, being controlled by local controllers, Controller$_{1-2}$, Controller$_{3-4}$, and individual drivers, Drive$_1$, Drive$_2$, Drive$_3$, Drive$_4$, as illustrated in the figure. Each individual driver controls speed and force to be applied to the connected wheel.

The inventive method for controlling each wheel and synchronising pairs of wheel of a robot 50 comprising several steps performed by the master controller. The master controller may be housed inside the robot 50, but it may also be located externally to this. This does however require more wireless communication between the individual local control means housed in the robot 50 and the master controller.

The first step is receiving a start and a stop position for the robot 50.

The start and stop positions will depend on the route set up for a robot 50 prior to picking up a box from a storage column 30 and placing it in another storage column 30. A route for a specific robot 50 will be set up by a supervisory system having control of all storage bins and their content.

The start position of a robot 50 will be the position where it is standing still. The robot 50 will keep track of this position at all time. This position can be acquired in different ways. One way is to track the x, y position of the robot 50 relative to the tracks on top of the frame structure. This will be the global position of the robot 50. This position can be acquired by means of tracking devices located externally to the robot 50 or by devices integrated in the robot 50. A combination of external and integrated tracking devices will increase the accuracy of position determination.

By using integrated tracking devices, the robot 50 will be able to keep track of its position when moving on the tracks, which are laid out as a grid on top of the frame structure, by detecting the number of crossings passed in x- and y-directions from a known start position, i.e. like moving between cell in a spreadsheet.

In addition to the start position, the master controller must also receive information of a stop location for controlling movements of the robot 50.

If a robot 50 is to move only in one direction according to a route for performing a complete operation, for picking up a storage bin from one storage column and lowering it in another storage column, there will only be one start and stop position for the complete operation. It is however more likely that a robot 50 move in different x- and y-directions, according to a route, for reaching a final destination. This may be the case if the complete route is running along different directions or due to other robots blocking the shortest route from a start to a stop position. In this case the first start position will be the position where the robot 50 is picking up or lowering a storage bin. The first stop position will then be the position of a route where the robot 50 must change direction for following the route. This stop position will then be the next start position etc. If the robot 50 has to change direction three times the will be three start and stop positions, i.e. a first, second and third leg of a route.

After start and stop positions of a first leg of a route of the robot 50 have been established, the next step is letting the master controller receive current speed $V_1$, $V_2$, $V_3$, $V_4$ and angular position pos$_1$, pos$_2$, pos$_3$, pos$_4$ of each wheel of the robot 50. This information is provided by means of speed and angular position sensors measuring these parameters on each wheel.

Current speed and angular position for each wheel are input to local controllers, Controller$_{1-2}$, Controller$_{3-4}$ which each are controlling synchronisation of pairs of wheels $W_1$ and $W_2$, $W_3$ and $W_4$.

When the robot 50 is moving along a route, the position of the robot 50 relative to the frame structure is tracked continuously and provided to the master controller.

In one embodiment, the position of the robot 50 is a global x, y position provided by an external tracking device tracking the robot 50 relative to the tracks.

In one or more other embodiments of the invention, the robot 50 further comprises track sensors for detecting and absolute position relative to the track it is currently driving on. Combining absolute position of the robot 50 with the global position will improve the accuracy of the determined position.

When the master controller has received information of the start and stop positions, current speed and angular position of each wheel, $W_1$, $W_2$, $W_3$ and $W_4$, as well as the current position of the robot 50, the master controller will use this information for setting up individual speed driving sequences, $V_{seq1-2}$, $V_{seq3-4}$, for each pair of wheels, $W_{1-2}$ and $W_{3-4}$.

Each speed driving sequence, $V_{seq1-2}$, $V_{seq3-4}$, is established based on speed and angular position data for each wheel in view of the set start and stop position and the current position of the robot 50.

These speed driving sequences $V_{seq1-2}$, $V_{seq3-4}$ are transmitted to each of the local controllers Controller$_{1-2}$, Controller$_{3-4}$ which in turn control the drive for each wheel Drive$_1$, Drive$_2$, Drive$_3$, Drive$_4$.

Each driving sequence will define a series of speed data defining acceleration, constant speed and deceleration for each pair of wheels during the movement from a start to a stop position. The local controllers, Controller$_{1-2}$, Controller$_{3-4}$, for each pair of wheels will use the speed driving sequences $V_{seq1-2}$, $V_{seq3-4}$ for controlling the individual drivers, Drive$_1$, Drive$_2$, Drive$_3$, Drive$_4$ for a wheel.

When the robot 50 is moving along its route, data defining the speed driving sequences will continuously be updated according to acceleration, constant speed and deceleration of the robot 50. This means that the driving sequences defining the speed for pairs of wheels may change along the route. The update rate of speed driving sequences can be set and transmitted at a predetermined rate. It may also change along the route of the robot 50 when it is moving from a start to a stop position.

The different steps defined above will be repeated until the robot 50 has reached its destination, or when it is to change direction, i.e. the steps are repeated between a start and stop position for the robot 50.

In one or more embodiments of the invention, the local controller controlling pairs of wheels will control the drive of a wheel to adjust the speed of a wheel 60 if current speed of the one wheel 50 is deviating from the set speed of the pair of wheels set by the speed driving sequence. This means that pairs of wheels along the same axis normally to the driving direction always will be synchronised to the speed set by the speed driving sequence irrespectively of possible factors slowing down the speed of a wheel, e.g. spinning, gliding, obstacles etc.

The local controllers are thus keeping pairs of wheels synchronised according to a set speed driving sequence. This will provide precise control of movements of a robot 50 even if the speed of one or several wheels for some reason are deviating form the speed set by the speed driving sequence.

The synchronisation can be performed at a fast rate for ensuring that pairs of wheels are totally synchronised. Typically, the speed and angular position of each wheel is measured 60 000 times each second, and corresponding continuous calculations are performed for controlling the drive of each wheel for keeping pairs of wheels synchronised to the speed set by the speed driving sequence.

The method described above provides optimal control of the movements of a robot 50 for moving it smoothly without an offlead angle from a start to a stop position irrespective of any disturbances that may occur for the wheels when rolling on the tracks.

One or more embodiments of the present invention are also defined by a software program product that when executed by a possessor performs the method described above. The processor is part of or connected to the master controller.

One or more embodiments of the invention are also defined by a controller for controlling movements of the robot 50 described above when moving from a start to a stop position. This will act as a master controller for the movements of the robot 50.

The master controller is connected to local controllers, Controller$_{1-2}$, Controller$_{3-4}$, controlling pair of wheels, W$_{1-2}$ and W$_{3-4}$. The local controllers, Controller$_{1-2}$, Controller$_{3-4}$, are providing speed and angular position data of each wheel 60 to the master controller by means of speed and angular sensors connected to the local controllers.

The master controller comprises input means for receiving a start and stop position of the robot 50 as well as current speed and angular position of each wheel 60 which is provided by the local controllers, Controller$_{1-2}$, Controller$_{3-4}$. It further comprises input means for receiving the position of the robot 50 relative to the frame structure.

The master controller further comprises calculation means for setting up speed driving sequences, $V_{seq1-2}$, $V_{seq3-4}$, for each pair of wheels 60, W$_{1-2}$ and W$_{3-4}$, based on current speed and angular position of each wheel 60, current position of the robot 50 and the start and stop position of the robot 50.

The master controller further comprises output means for transmitting the speed driving sequences, $V_{seq1-2}$, $V_{seq3-4}$, to each of the local controllers, Controller$_{1-2}$, Controller$_{3-4}$ thereby controlling accelerating and decelerating of each pair of wheels 60, W$_{1-2}$ and W$_{3-4}$. Speed data is thus controlled by the master controller and may be updated each 5 ms.

The master controller is in one embodiment housed inside the robot 50. It is then connected to the local controllers Controller$_{1-2}$, Controller$_{3-4}$, controlling pairs of wheels, W$_{1-2}$ and W$_{3-4}$, and reading speed and angular position data from each wheel.

The master controller may in one embodiment be connected to a device providing a global position relative to the frame structure. In another embodiment, this information may be provided by external means transmitting position data of the robot 50 to the master controller. A combination of onboard and external means for providing a global position of the robot 50 is also feasible.

The accuracy for determining the position of the robot 50 can be improved by providing local position data provided by track sensors comprised in the robot 50.

One or more embodiments of the present invention will provide controlled and smooth movements of a robot 50 that is moving. The robot will always move evenly along the tracks, i.e. prevent movements of the robot 50 in an offlead angle due to skewed load, slipping or friction issues.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method for controlling movement of a robot on a plurality of tracks laid out on a frame structure forming a grid, the method comprising:
   detecting a current speed and an angular position for one wheel in a pair of wheels of the robot;
   tracking a current position of the robot relative to at least a portion of the frame structure;
   setting a driving sequence for the pair of wheels, based on a position information of the robot, wherein the driving sequence defines an acceleration, a deceleration, and a set speed for moving the robot from the current position to a stop position; and
   adjusting movement of the one wheel when the current speed detected for the one wheel deviates from the set speed defined by the driving sequence, such that movements of the pair of wheels are synchronized.

2. The method according to claim 1, wherein the driving sequence for the pair of wheels is based on the stop position of the robot, the current position of the robot, and the current speed and the angular position of the one wheel.

3. The method according to claim 2, wherein the driving sequence for the pair of wheels is further based on a start position of the robot.

4. The method according to claim 1, wherein the current position of the robot is represented by a (x, y) information relative to the frame structure, provided by an external tracking device.

5. The method according to claim 1, wherein the current position of the robot is a local position of the robot relative to a track on which the robot is moving, provided by a tracking device disposed in the robot.

6. The method according to claim 1, wherein the setting is performed repeatedly at a predetermined rate.

7. The method according to claim 1, further comprises setting a plurality of driving sequences corresponding to a plurality of pairs of wheels.

8. The method according to claim 1, wherein the driving sequence is set based on a plurality of start positions and a plurality of stop positions according to a route the robot is to follow.

9. The method according to claim 1, wherein the pair of wheels are along a same axis normal to a driving direction of the robot.

10. A system for controlling movement of a robot having a pair of wheels on tracks laid out on a frame structure forming a grid, wherein the system comprises:
 a master controller configured to:
  receive a current speed and an angular position for one wheel in the pair of wheels,
  receive a current position of the robot relative to at least a portion of the frame structure, and
  calculate a driving sequence for the pair of wheels, based on a position information of the robot, wherein the driving sequence defines an acceleration, a deceleration, and a set speed for moving the robot from the current position to a stop position; and
 a local controller configured to adjust movement of the one wheel when the current speed detected for the one wheel deviates from the set speed defined by the driving sequence, such that movements of the pair of wheels are synchronized.

11. The system according to claim 10, wherein the driving sequence is calculated based on the stop position of the robot, the current position of the robot, and the current speed and the angular position of the one wheel.

12. The system according to claim 11, wherein the driving sequence is calculated based on a start position of the robot.

13. The system according to claim 10, wherein the current position of the robot is received from a tracking device disposed external to the robot to provide the current position represented by a (x, y) information relative to the frame structure.

14. The system according to claim 10, wherein the current position of the robot is received from a tracking device disposed in the robot to provide the current position which is a local position of the robot relative to a track on which the robot is moving.

15. The system according to claim 10, wherein the master controller is configured to repeatedly calculate the driving sequence at a predetermined rate.

16. The system according to claim 10, wherein the pair of wheels are along a same axis normal to a driving direction of the robot.

17. One or more non-transitory computer-readable media storing a software program product that, when executed by one or more processors of a computing system, cause the computing system to perform a method comprising:
 receiving a current speed and an angular position of one wheel in a pair of wheels of a robot;
 receiving a current position of the robot;
 calculating a driving sequence for the pair of wheels, based on a position information of the robot, wherein the driving sequence defines an acceleration, a deceleration, and a set speed for moving the robot from the current position to a stop position; and
 adjusting movement of the one wheel when the current speed detected for the one wheel deviates from the set speed defined by the driving sequence, such that movements of the pair of wheels are synchronized.

18. The one or more non-transitory computer-readable media according to claim 17, wherein the method further comprises calculating the driving sequence based on the stop position of the robot, the current position of the robot, and the current speed and the angular position of the one wheel.

19. The one or more non-transitory computer-readable media according to claim 17, wherein the method further comprises calculating the driving sequence based on a start position of the robot.

20. The one or more non-transitory computer-readable media according to claim 17, wherein the calculating is performed repeatedly at a predetermined rate.

* * * * *